US012000355B2

(12) United States Patent
Zilker et al.

(10) Patent No.: US 12,000,355 B2
(45) Date of Patent: Jun. 4, 2024

(54) PISTON FOR INTERNAL COMBUSTION ENGINE

(71) Applicant: FEDERAL-MOGUL NURNBERG GMBH, Nuremberg (DE)

(72) Inventors: Julian Zilker, Biebelried (DE); Michael Scherer, Furth (DE); Olga Seller, Nuremberg (DE); Sven Ungermann, Nuremberg (DE); Ralf Meske, Schwabach (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 0 days.

(21) Appl. No.: 17/622,254

(22) PCT Filed: Jun. 25, 2020

(86) PCT No.: PCT/EP2020/067834
§ 371 (c)(1),
(2) Date: Dec. 23, 2021

(87) PCT Pub. No.: WO2020/260466
PCT Pub. Date: Dec. 30, 2020

(65) Prior Publication Data

US 2022/0252019 A1 Aug. 11, 2022

(30) Foreign Application Priority Data

Jun. 26, 2019 (DE) ..................... 10 2019 209 248.9

(51) Int. Cl.

| | |
|---|---|
| ***F02B 3/00*** | (2006.01) |
| ***F02F 3/02*** | (2006.01) |
| *F02F 3/00* | (2006.01) |

(52) U.S. Cl.
CPC ........ *F02F 3/02* (2013.01); *F02F 2003/0007* (2013.01)

(58) Field of Classification Search
CPC .... F02F 3/0076; F02F 3/00; F02F 2003/0007; F16J 1/001; B23K 2101/003
USPC ...................................................... 123/193.6
See application file for complete search history.

(56) References Cited

U.S. PATENT DOCUMENTS

| | | | | |
|---|---|---|---|---|
| 10,161,353 B2 * | 12/2018 | Oso | F02F 3/10 |
| 10,823,109 B2 * | 11/2020 | Lormes | F02F 3/02 |
| 11,408,507 B2 * | 8/2022 | Ungermann | F16J 9/22 |
| 2008/0216790 A1 | 9/2008 | Breidenbach et al. | |
| 2015/0330329 A1 | 11/2015 | Alves Dos Santos Dias et al. | |
| 2016/0169150 A1 * | 6/2016 | Freidhager | F02F 3/22 123/193.6 |

FOREIGN PATENT DOCUMENTS

| | | |
|---|---|---|
| CN | 204327307 U | 5/2015 |
| DE | 102013214738 A1 | 1/2015 |
| DE | 102014222416 A1 | 5/2016 |

(Continued)

*Primary Examiner* — Long T Tran
*Assistant Examiner* — James J Kim
(74) *Attorney, Agent, or Firm* — Robert L. Stearns; Dickinson Wright, PLLC

(57) ABSTRACT

A piston (10) for an internal combustion engine, includes shaft wall sections (18) for supporting in a cylinder or a cylinder liner, and at least one base support (20) that is connected thereto in the circumferential direction, and which has at least one contour that forms a section of a helix.

11 Claims, 2 Drawing Sheets

(56) References Cited

FOREIGN PATENT DOCUMENTS

| | | | |
|---|---|---|---|
| JP | 2006057481 | A | 3/2006 |
| JP | 2010112357 | A | 5/2010 |
| JP | 2010164012 | A | 7/2010 |
| JP | 2014058945 | A | 4/2014 |
| WO | 2014094096 | A1 | 6/2014 |

* cited by examiner

PISTON FOR INTERNAL COMBUSTION ENGINE

BACKGROUND

1. Technical Field

The invention relates to a piston for an internal combustion engine.

2. Related Art

Pistons for internal combustion engines are subjected to extremely high loads, particularly in the case of gasoline engines with high specific power, which can be in the order of 100 kW/l. This is due on the one hand to high ignition pressures, which can be in the region of 120 bar, and on the other hand to the extremely high temperatures prevailing in the combustion chamber. Particularly high loads occur on account of the kinematics of the crank drive on the pressure side of the piston, and here in particular in the lowest annular groove of the piston. Particularly in a load case that can be described as "maximum lateral force", high tensile stress occurs in the lowermost annular groove of the piston on the pressure side, since the piston skirt reacts to lateral forces in a more resilient manner than the piston crown, which comprises the annular region. Moreover, in order to keep the loading of the piston boss and other engine components due to inertia forces low, it is necessary to save weight wherever possible. This is achieved, for example, by forming so-called pockets radially outside the piston pin in the axial direction thereof. In other words, connecting walls which connect the supporting shaft wall sections are set back radially inwardly.

Numerous pistons from the prior art are designed in this way. A rounded section is often formed between the shaft wall section and the pocket.

SUMMARY

Against this background, the object of the invention is to ensure fatigue strength, particularly in the lowermost groove of the piston, without significantly increasing the weight of the piston, by reducing the maximum stress occurring here in particular.

According thereto, the piston comprises shaft wall sections used for supporting in a cylinder or in a cylinder liner, to which so-called base supports are connected in the circumferential direction toward the piston crown, which base supports have at least one contour that forms a section of a helix. In other words, the distance between the bottom edge, in other words the end of the base support facing away from the piston crown, and the lowermost annular groove follows a slope rolled around a cylinder. This bottom edge may be the same over substantially the entire radial depth of the base support. In other words, looking radially at the base support this appears as a line. However, the contour described may only be present radially on the outside or inside of the base support, and the bottom periphery of the base support may descend or rise from this edge. In Cartesian coordinates, the helix can be expressed as follows:

$$\vec{x}(t) = \begin{pmatrix} r\cos(t) \\ r\sin(t) \\ \frac{h}{2\pi}t \end{pmatrix}$$

Here, r is the radius of the cylinder, h is the thread pitch and t is the curve parameter. The slope k is:

$$k = \frac{h}{2\pi r}$$

As initial simulations have shown, this can significantly reduce the stress in the lowermost piston ring groove. Compared to the design used hitherto, the maximum principle stress can be reduced by approximately 30 MPa. This results in an improvement of the fatigue strength by approximately 25%. Furthermore, it has been shown that in the case of a typical piston, the weight increase is approximately just 2 g. Thus, the objective of constructing a piston so as to be both comparatively light and at the same time strong can be achieved in an advantageous manner by the invention. The base support therefore ensures advantageous support for the piston crown.

Although the described design can be provided on both sides of a piston, it is preferred on account of the aforementioned load situation that the contour according to the invention be provided at least on the pressure side of the piston.

It is also preferred that the contour according to the invention be provided on both sides of the shaft wall section, so that the advantages according to the invention can be utilized comprehensively.

This also applies to the preferred measure according to which at least one base support extends from a shaft wall section as far as the region of a pin boss limit.

Initial simulations have shown that the slope of the helix according to the invention should be at least 1:10 and at most 1:1. At present, a value of approximately 1:2 is preferred.

The base support designed in accordance with the invention has a depth as measured in the radial direction which is preferably more or less the same as the depth as measured in the same direction of the lowermost annular groove of the piston. This allows low-stress support of the region weakened by the annular groove of the piston to be particularly reliably achieved. The depth described may be up to twice the depth of the piston ring groove, and in the case of a normal gasoline engine piston the described depth may be approximately 6 mm.

Located radially inside the base supports described are the connecting walls connecting the shaft wall sections, and in view of weight-saving it is preferred that spacing is provided here, or in other words that at least one base support is spaced apart in the radial direction from a connecting wall. What therefore remains here is the "pocket", which is advantageous for weight-saving.

In order to avoid notch effects, a rounded section is preferably provided at the transition between the shaft wall section and at least one base cover.

BRIEF DESCRIPTION OF THE DRAWINGS

In the following, a preferred embodiment example of the invention will be described in more detail with reference to the drawings. In the drawings:

FIG. 3 shows a perspective bottom view of a piston according to the invention with the helix drawn in.

DETAILED DESCRIPTION

Figure 1:
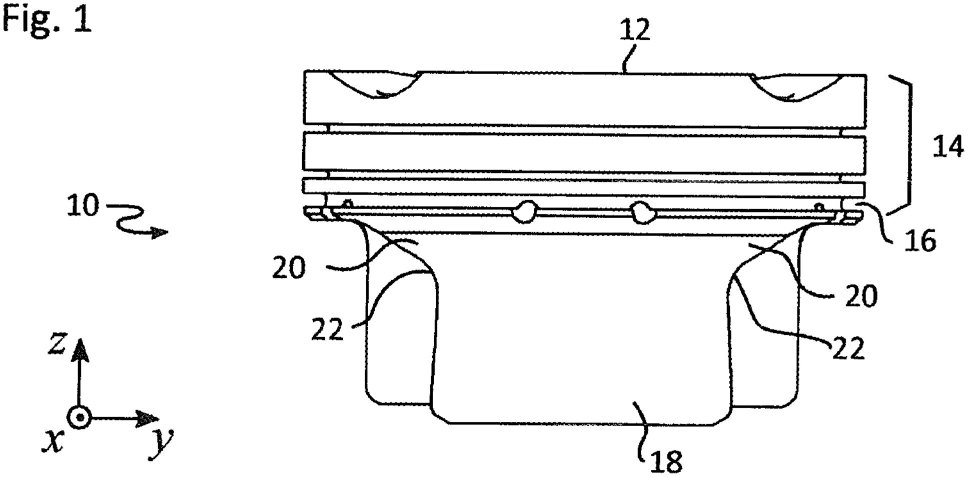
FIG. 1 shows a side view of a piston according to the invention.

As can be seen from FIG. 1, the piston according to an embodiment comprises on its top side according to FIG. 1 a piston crown 12, an annular region 14 with a lowermost annular groove 16 and shaft wall sections 18, only one of which can be seen in its entirety in FIG. 1. The shaft wall sections 18 have a more or less constant width when measured in the circumferential direction. In the embodiment example shown, the width is more or less constant along the piston stroke axis (vertical in FIG. 1), with a slight widening toward the bottom side, i.e. away from the piston crown 12.

So-called base supports 20 connect in the circumferential direction to both sides of the pressure-side shaft wall section 18 shown, which base supports are formed so as to be mirror-symmetrical in the case shown. FIG. 1 shows the contour on the bottom side of the base support 20 as an inclined surface, but FIG. 3 reveals that this contour follows a helix.

A detailed description is provided in the following in conjunction with FIG. 3. With reference to FIG. 1 it should once again be noted that the transition from the shaft wall section 18 to the respective base support 20 is configured in the form of a rounded section 22.

Figure 2:
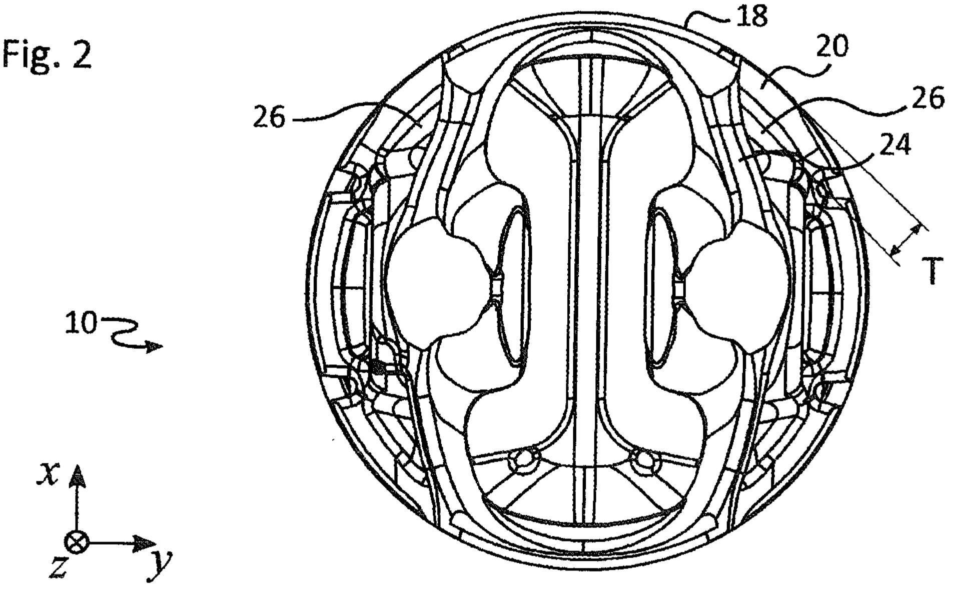
FIG. 2 shows a bottom view of a piston according to the invention.

In addition to this, FIG. 2 shows the depth T, as measured in the radial direction, of the base support 20. It also shows that each base support 20 is spaced apart from the connecting wall 24 connecting the shaft wall sections, although the connecting walls 24 diverge somewhat in the direction of the piston pin axis. As a result, the pockets 26 that are advantageous for weight-saving remain between them.

Figure 3:
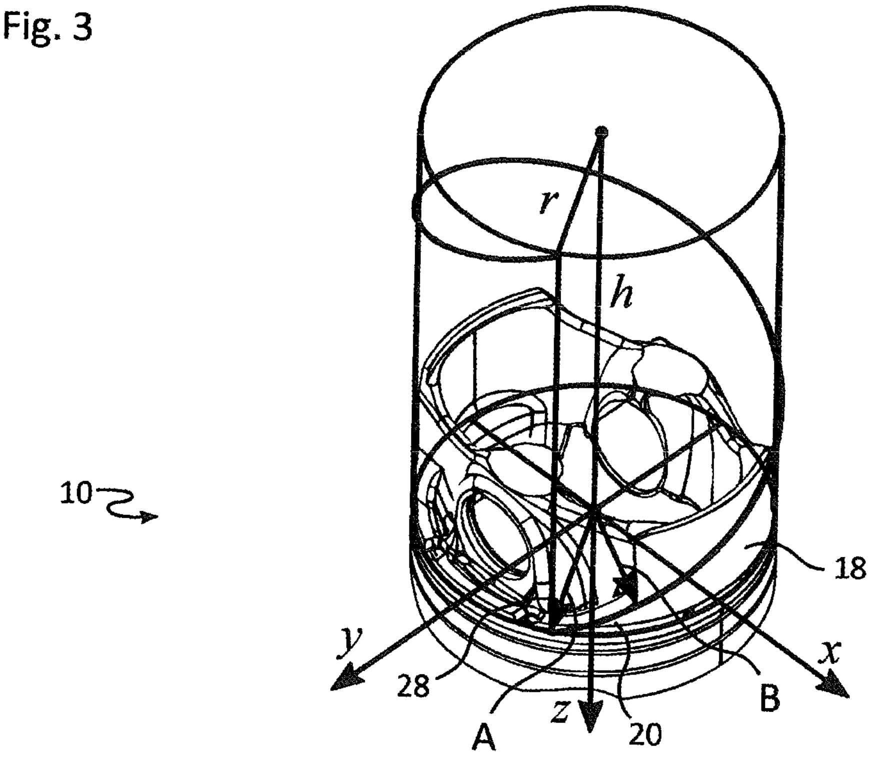

FIG. 3 now shows in detail the contour of a base support 20. It should be noted that this also applies to the base support on the other side, with opposite helicity. The helicity shown in FIG. 3 can be described as positive. In other words, if the x axis is mentally flipped onto they axis, the helix moves in the direction of the z axis.

It can also be seen from FIG. 3 that the base support begins in the region of the rounded section 22 towards the shaft wall section 18 (arrow B) and ends more or less in the region of the pin boss limit 28 (arrow A). In the case shown, the slope is approximately 1:2, and the depth T (cf. FIG. 2) is at approximately 6 mm roughly twice as deep as the depth of the lowermost annular groove 16.

It should also be mentioned that the radial outer side of at least one base support may be on the same cylinder outer surface as the shaft wall section. However, since the base support is not required for radial support on a cylinder (liner) wall, the base support may be set back in the radial direction relative to the shaft wall section.

The invention claimed is:

1. A piston for an internal combustion engine, comprising:

a pair of shaft wall sections 18 for support in a cylinder or cylinder liner;

at least one base support extending in a circumferential direction from at least one of the shaft wall sections, wherein a bottom side of the at least one base support includes a curved segment having a positive length and extending along a path of a helix in the circumferential direction, and wherein the helix has a slope (k) ranging from 1:10 to 1:1 according to the following equation:

$$k = \frac{h}{2\pi r}$$

where r is radius of a cylindrical outer surface of the base support and his thread pitch.

2. The piston according to claim 1, wherein a base support is provided at least on the pressure side of the piston.

3. The piston according to claim 1, wherein a base support is provided on both sides of at least one shaft wall section.

4. The piston according to claim 1, wherein at least one base support extends as far as the region of a pin boss limit.

5. The piston according to claim 1, wherein a depth, as measured in the radial direction, of at least one base support is at least the same as a depth, as measured in the radial direction, of a lowermost annular groove.

6. The piston according to claim 5, wherein the depth of the base support is no more than twice the depth of the lower most annular groove.

7. The piston according to claim 1, wherein the at least one base support is spaced apart from a connecting wall connecting the pair of shaft wall sections.

8. The piston according to claim 1, wherein a transition between one of the pair of shaft wall sections and the at least one base support is provided with rounded section.

9. The piston according to claim 1, wherein the helix has a slope of 1:2.

10. The piston according to claim 1, wherein the slope (k) ranges from about 1:2 to 1:1.

11. The piston according to claim 1, wherein the helix is expressed as follows in Cartesian coordinates:

$$\vec{x}(t) = \begin{pmatrix} r\cos(t) \\ r\sin(t) \\ \frac{h}{2\pi}t \end{pmatrix}$$

where r is radius of a cylindrical outer surface of the base support, h is thread pitch, and t is curve parameter.

* * * * *